(12) United States Patent
McMillen et al.

(10) Patent No.: US 7,300,106 B2
(45) Date of Patent: Nov. 27, 2007

(54) TRIM FOAM LUMBAR

(75) Inventors: Robert J. McMillen, Tecumseh (CA); Larry D. Janzen, Harrow (CA)

(73) Assignee: Schukra of North America, Ltd., Lakeshore, Ontario (CA)

( * ) Notice: Subject to any disclaimer, the term of this patent is extended or adjusted under 35 U.S.C. 154(b) by 0 days.

(21) Appl. No.: 11/393,434

(22) Filed: Mar. 30, 2006

(65) Prior Publication Data
US 2007/0236062 A1 Oct. 11, 2007

(51) Int. Cl.
A47C 7/46 (2006.01)
(52) U.S. Cl. .................................. 297/284.4
(58) Field of Classification Search ............. 297/284.4, 297/284.1
See application file for complete search history.

(56) References Cited

U.S. PATENT DOCUMENTS

| | | | |
|---|---|---|---|
| 3,644,614 A | 2/1972 | Streschnak et al. | |
| 3,961,823 A | 6/1976 | Caudill, Jr. | |
| 4,337,931 A | 7/1982 | Mundell et al. | |
| 4,798,416 A | 1/1989 | Faust et al. | |
| 4,832,400 A * | 5/1989 | Aoki et al. | 297/284.4 X |
| 5,022,709 A | 6/1991 | Marchino | |
| 5,132,063 A | 7/1992 | Hughes | |
| 5,327,596 A | 7/1994 | Wallace et al. | |
| 5,601,332 A | 2/1997 | Schultz et al. | |
| 5,605,373 A | 2/1997 | Wildern, IV et al. | |
| 5,723,197 A | 3/1998 | Grund et al. | |
| 5,823,620 A * | 10/1998 | Le Caz | 297/284.4 X |
| 6,443,525 B1 | 9/2002 | Haupt | |
| 6,460,208 B1 | 10/2002 | Schuster | |
| 6,499,803 B2 * | 12/2002 | Nakane et al. | 297/284.4 X |
| 6,682,494 B1 | 1/2004 | Sleichter, III et al. | |
| 6,838,155 B2 | 1/2005 | Cappucci et al. | |
| 6,877,808 B2 | 4/2005 | Lichtinger et al. | |
| 6,918,884 B2 | 7/2005 | Knelsen et al. | |
| 7,011,369 B2 | 3/2006 | Massara et al. | |
| 2005/0179306 A1 | 8/2005 | White et al. | |
| 2006/0152051 A1 | 7/2006 | Colja et al. | |
| 2006/0261653 A1 | 11/2006 | McMillen et al. | |
| 2006/0273643 A1 | 12/2006 | McMillen | |

FOREIGN PATENT DOCUMENTS

DE 32 12 568 A1 10/1983

OTHER PUBLICATIONS

U.S. Appl. No. 60/682,228, filed May 18, 2005, McMillen et al.
U.S. Appl. No. 60/686,579, filed Jun. 2, 2005, McMillen.

* cited by examiner

*Primary Examiner*—Anthony D. Barfield
(74) *Attorney, Agent, or Firm*—Husch & Eppenberger LLC; Grant D. Kang; Dennis J. M. Donahue, III

(57) ABSTRACT

A seat support includes a lumbar, a foam pad, trim wires, and an actuator. The lumbar is supported by and actuated between trim wires which are embedded within the seat's foam pad. The actuator is connected to and adjusts the lumbar relative to the foam pad. The foam pad preferably includes passages through which fasteners can extend between the lumbar to the trim wires.

22 Claims, 7 Drawing Sheets

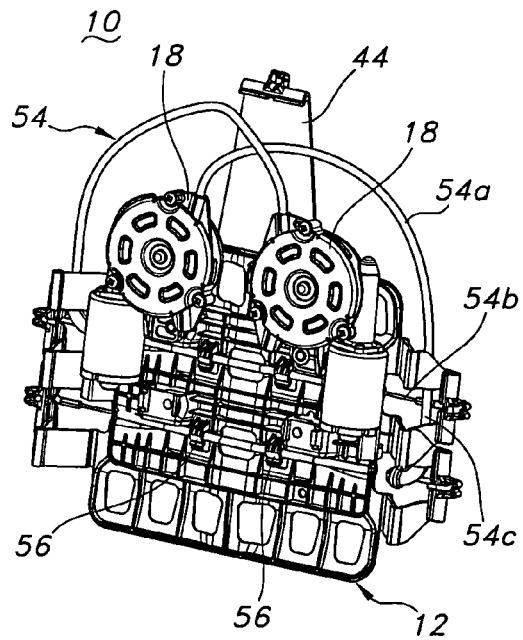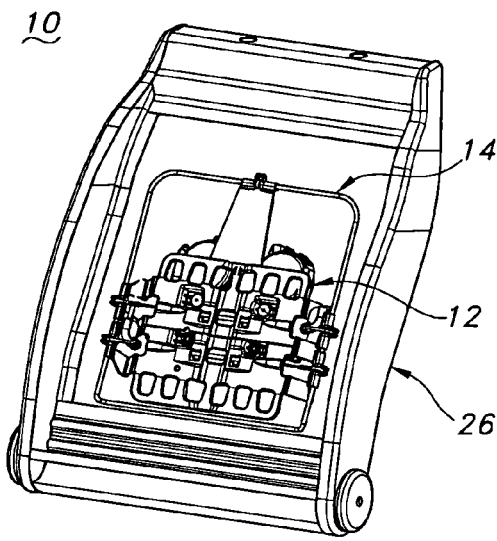
FIG. 4A  FIG. 4B
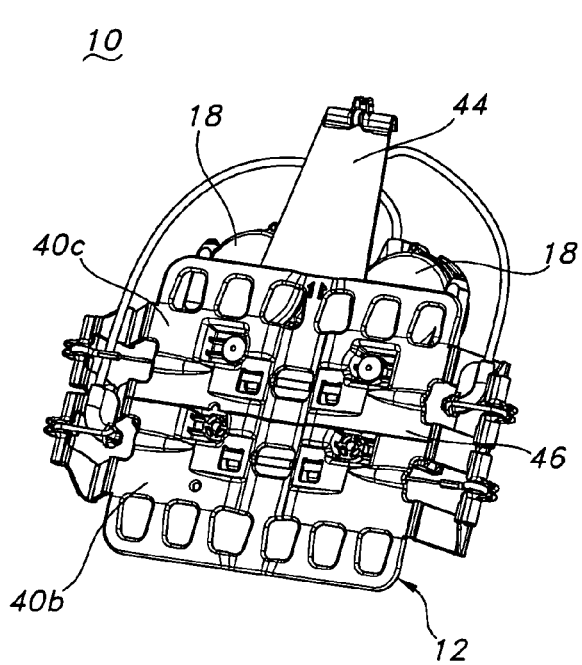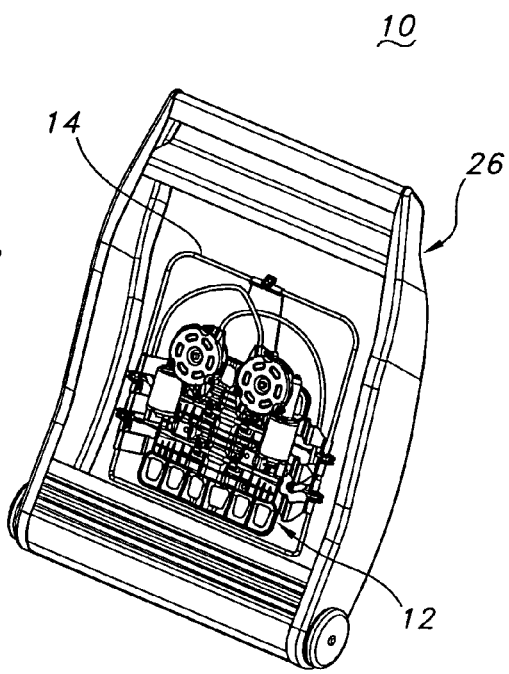
FIG. 5A  FIG. 5B

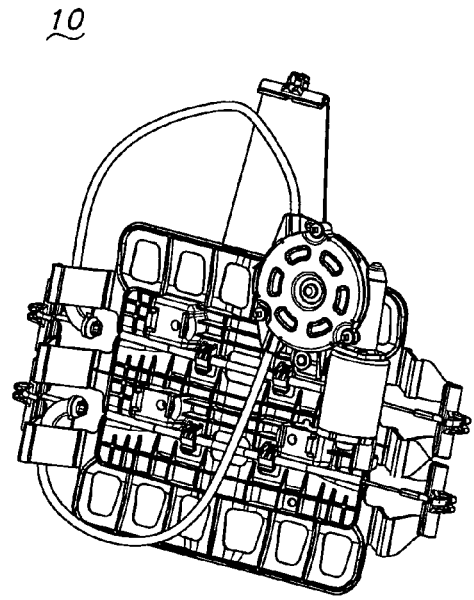
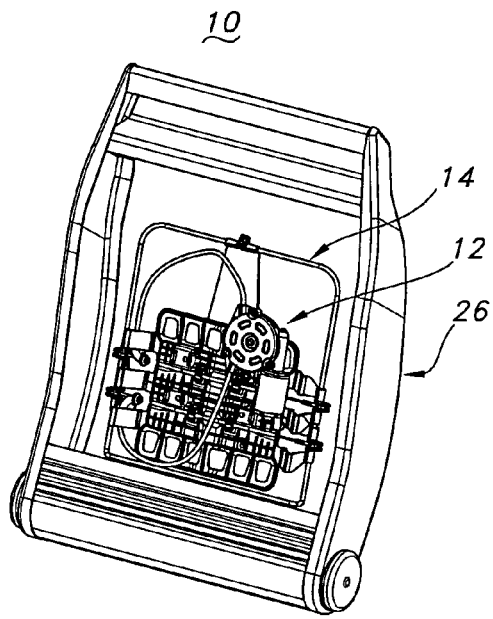
FIG. 6A        FIG. 6B
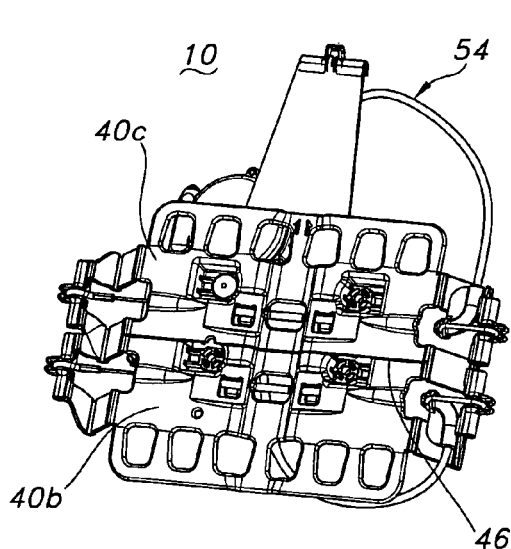
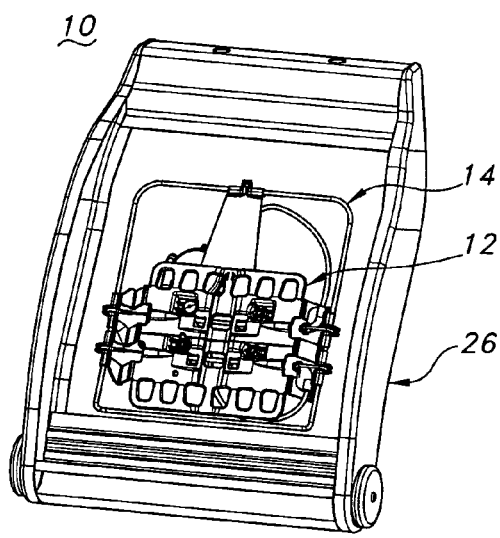
FIG. 7A        FIG. 7B

TRIM FOAM LUMBAR

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to lumbar supports for seats, and more particularly to seats having a trim wire in a foam support.

2. Related Art

Many different types of lumbar supports have been installed into seating systems using a variety of mounting and fastening devices. For example, U.S. Pat. No. 5,022,709 teaches various combinations of hinges, tabs, pins and shims to connect a back support to the seat frame. In another example, U.S. Pat. No. 6,918,884 teaches various combinations of guide rods, back plates, and brackets to connect a lumbar support to the seat frame. In yet another example, Published Patent Application US2005/0179506 teaches the use of side wires or rods that form a portion of the seat back's wire basket and extend out to and connect with the seat frame. According to the description of this earlier invention, the foam cushion has wires that are connected to these frame attachment wires, and as the ergonomic support is actuated within the frame, the foam cushion is driven through this connection. However, according to the teaching of this publication, the bolsters and any lumbar support remain are connected to and supported by the seat frame rather than being supported by the trim wires. Finally, U.S. Pat. No. 7,011,369 teaches a lumbar support that is integral with a trim attachment array. However, as particularly taught by the '369 patent, the integral with a trim attachment array "is adapted to replace the standard trim wires which are molded into the seat back and cushion foam of a standard, state-of-the-art vehicle seat."

In each of these prior art seating systems, the lumbar device is typically attached to the seat frame in a vertical or horizontal manner which requires custom packaging and new tooling and design for the frame attachment. Additionally, plastic components are also typically required to eliminate the BSR issues for the seats. For example, guide wires traditionally support a vertical lumbar within the seat frame, and wing wires traditionally support a horizontal lumbar within the seat frame. Accordingly, the frame requires holes, lance tabs, or other brackets or mounting structures to support the lumbars. Therefore, the traditional designs requires a custom fit for each seat frame because wing wires must be configured differently for each particular frame due to varying width, tapering, foam interference and/or reclining clearance issues.

Modular seat assembly techniques require components to be designed for ease and speed of assembly. Modular lumbar supports often include vertical extensions. In both assembly and finished use, the extra leverage such extensions place on anchors can cause undesirable wear and binding. Accordingly, along with the need for strong, economical, compact components in seat design, there is a continuing need in seat assembly procedures to increase the economy, speed and efficiency of component assembly and shipping. Furthermore, as described in U.S. Pat. No. 5,553,919, US Pub. No. 2004/0108760, and U.S. Ser. No. 11/295,425, there is a benefit for providing spinal relief when supporting the spine or for using a shaped pad to provide comfort. It is preferable to apply lumbar supporting pressure bilaterally adjacent to the spinal column, while maintaining a vertical recess or channel to accommodate the vertebrae, because the bony vertebrae of the spine may become uncomfortable if direct pressure is applied to them by a lumbar support pressure surface.

Therefore, there is a need in the art for an improved lumbar support that can be easily fit into any seat back using a foam pad with a trim wire and that reduces the space required for installation of the lumbar support. Further, there is a need in the art for an improved lumbar support that reduces the components required to fit the lumbar into the seat frame and also minimizes noise, shake and rattle (generally referred to as BSR). Even though some prior art references have suggested connecting back support wires to a wire in the foam cushion of the seat or using an integral trim attachment array for supporting a lumbar, none of these references teach or suggest using a standard trim wire design to support a lumbar within the seat's foam pad. Accordingly, there remains a need for such a system which can be adapted to any seat that already uses a trim wire that is at least partially embedded in foam padding so that no changes are required to the design of the seat other than increasing the strength of the trim wire to support the lumbar. Additionally, there continues to be a need for strong, economical, compact components that further increase the economy, speed and efficiency of component assembly and shipping. Finally, all of these structural and assembly criteria should be accomplished with the goal of maintaining the comfort of the seat.

SUMMARY OF THE INVENTION

According to one aspect of the present invention, a seat support includes a lumbar that is supported by and actuated between trim wires that are embedded within the seat's foam pad. The actuator is connected to and adjusts the lumbar relative to the foam pad. The foam pad preferably includes passages through which hinged extensions on the sides of the lumbar extend to connect the lumbar to the trim wires.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4-7 are perspective views of alternative embodiments of trim foam lumbar according to the present invention.

DETAILED DESCRIPTION OF THE PREFERRED EMBODIMENTS

Figure 1A:
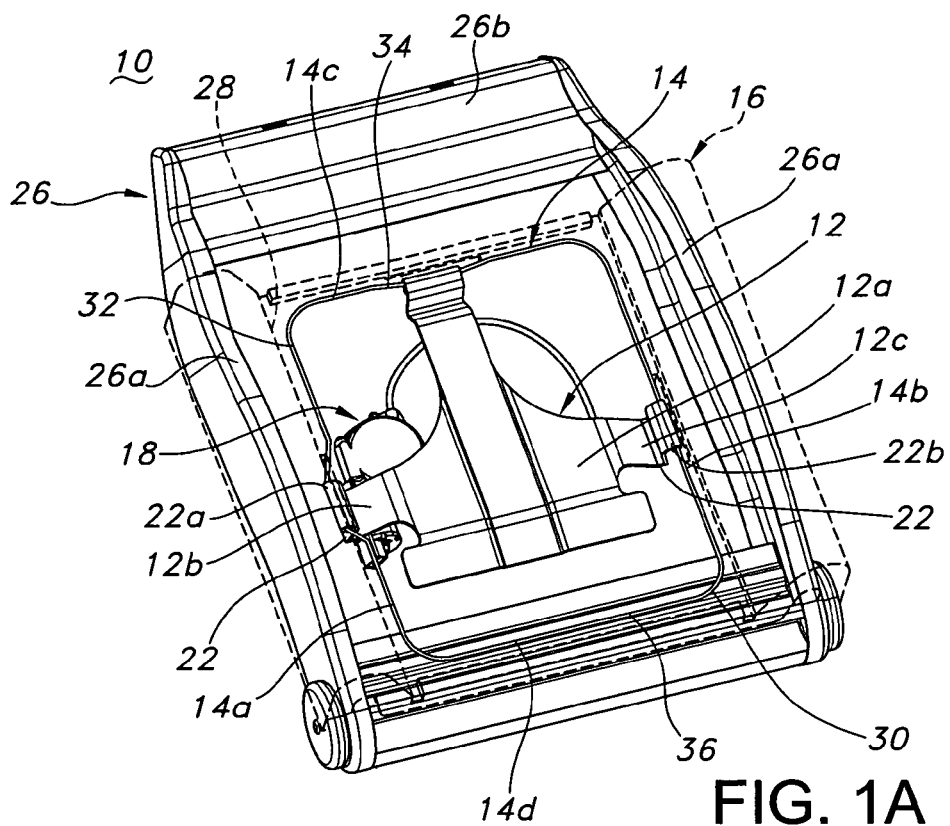
FIGS. 1A and 1B are front and back perspective views, respectively, of the trim foam lumbar installed in a seat frame.
Figure 1B:
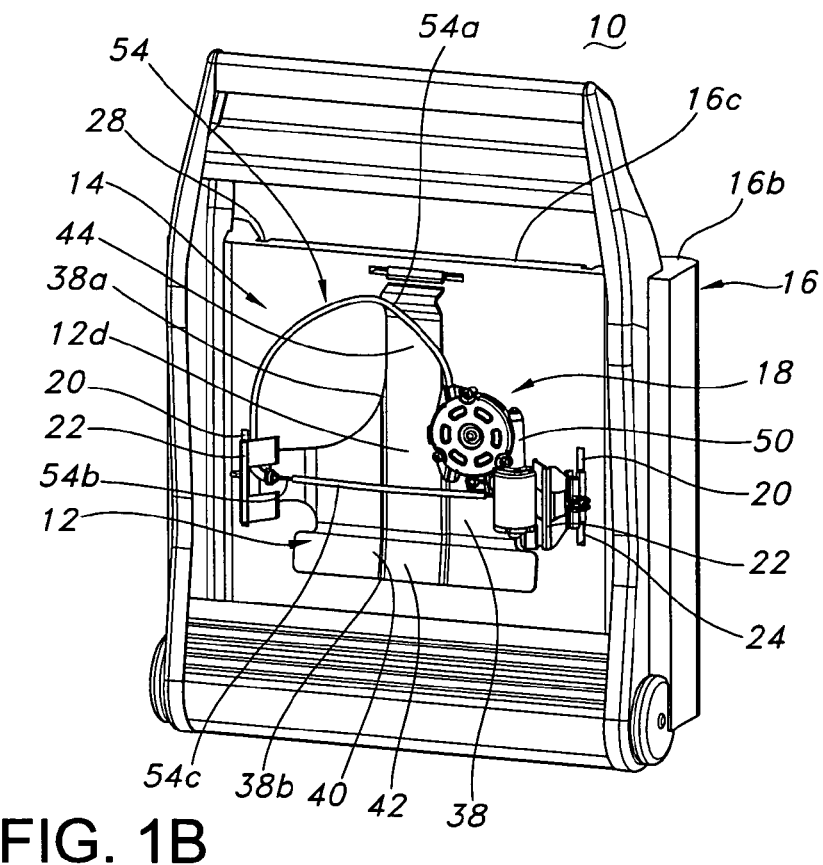
Figure 2:
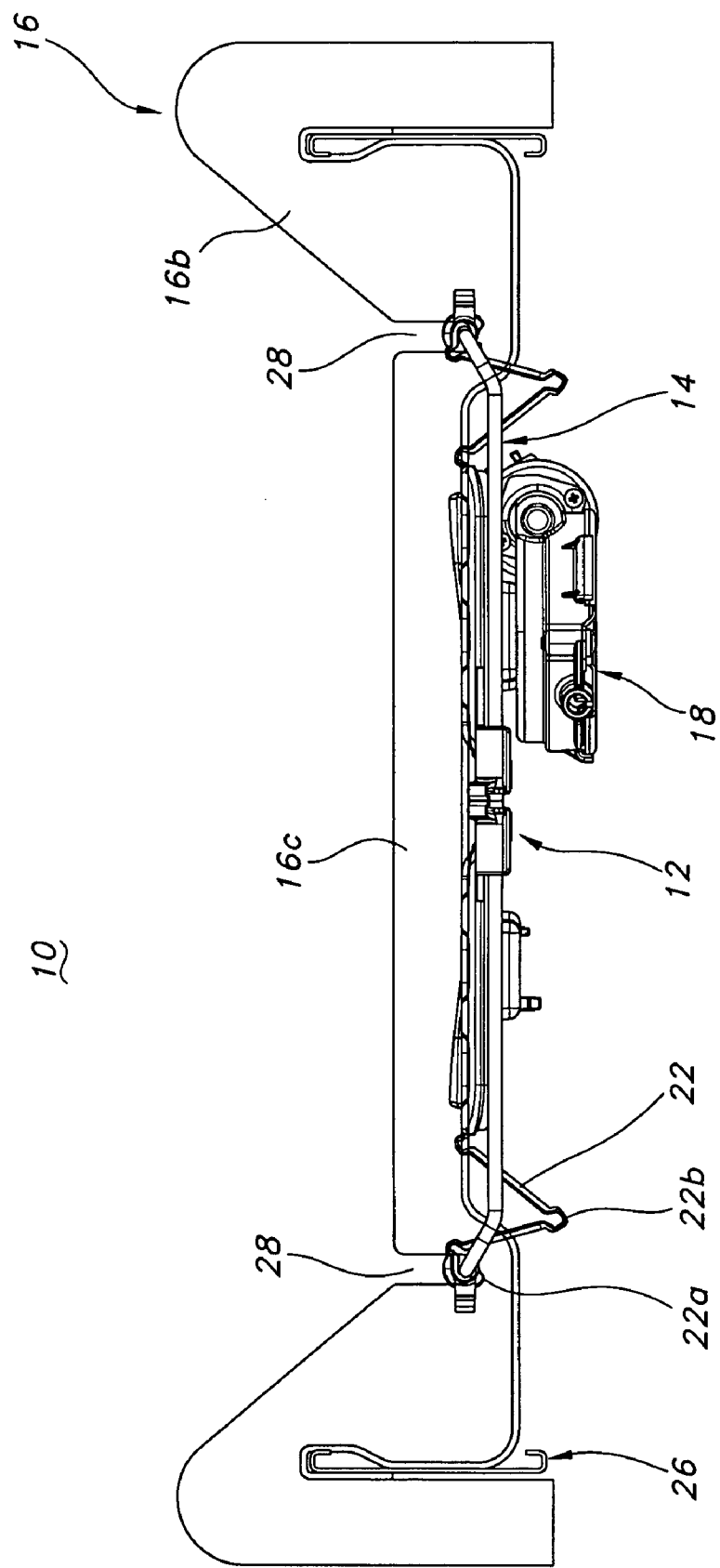
FIG. 2 is a plan view of the trim foam lumbar illustrated in FIGS. 1A and 1B.
Figure 3A:
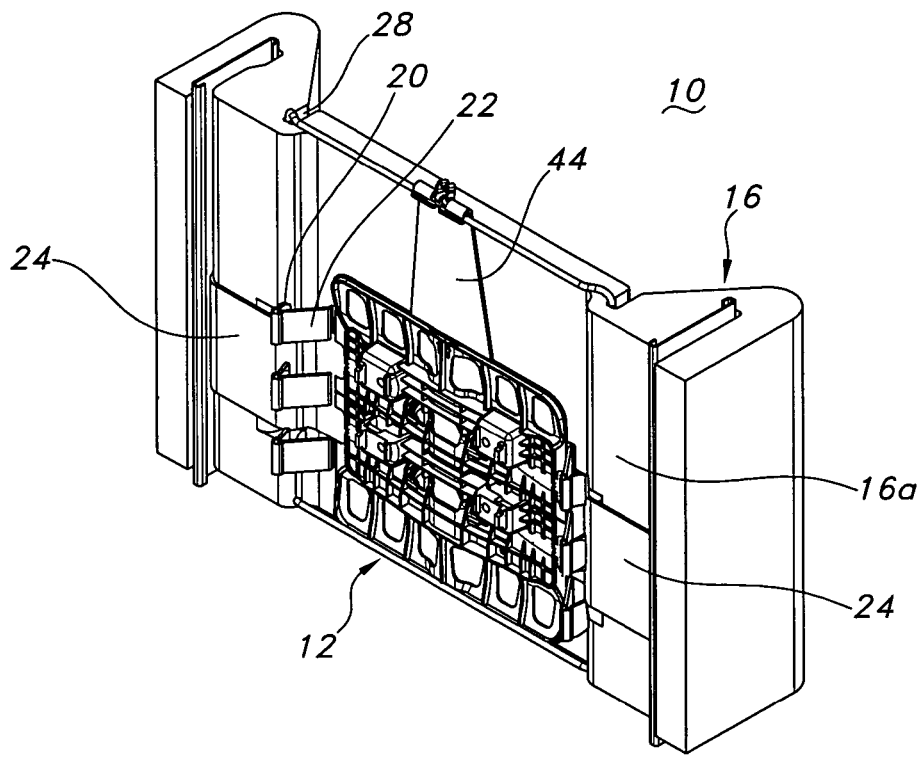
FIGS. 3A and 3B are back and front sectional views, respectively, of the trim foam lumbar illustrated in FIGS. 1A and 1B.
Figure 3B:
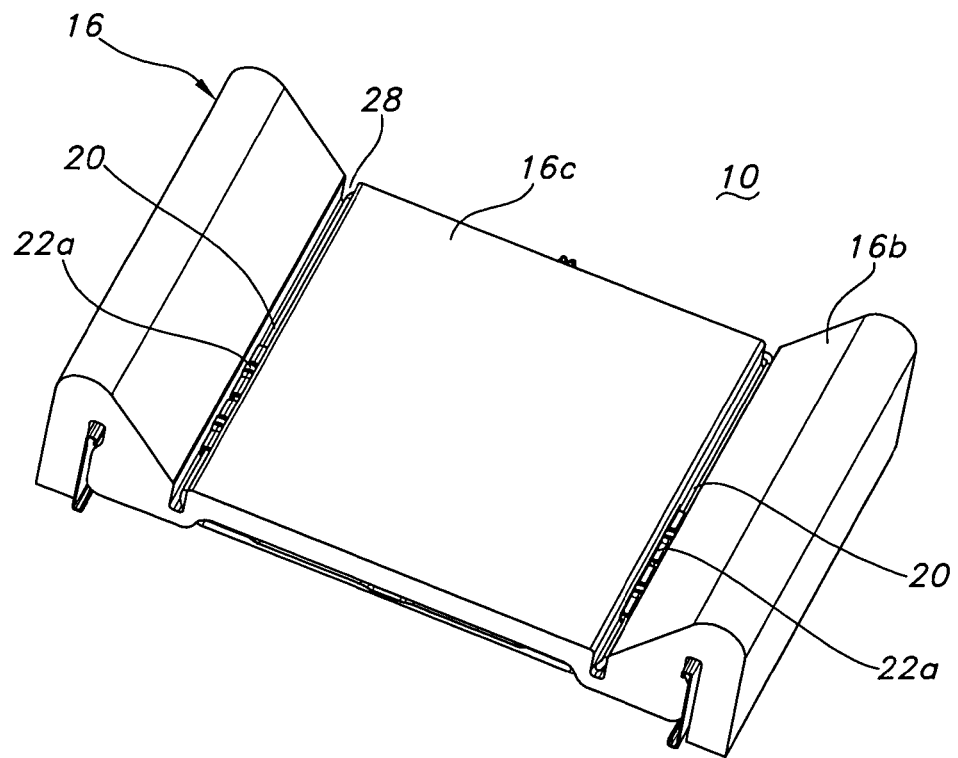
Figure 8C:
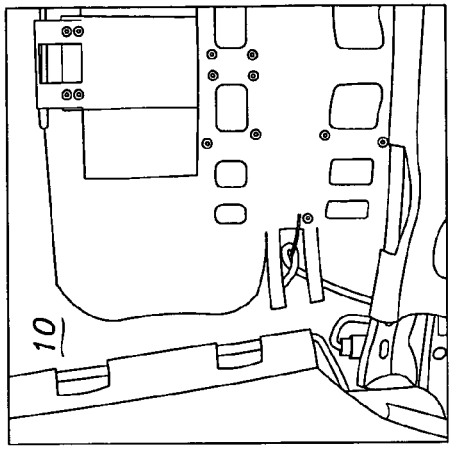
FIG. 8 is a perspective view of the trim foam lumbar with detail views of alternative manual drives that can be used with the present invention.
Figure 8F:
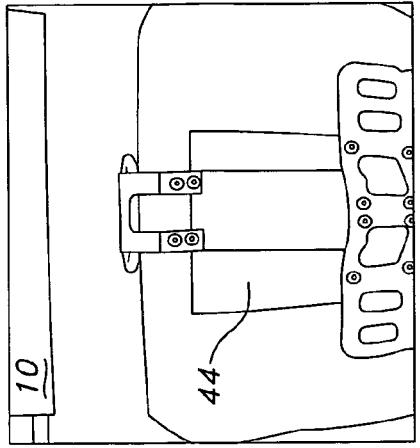
Figure 8B:
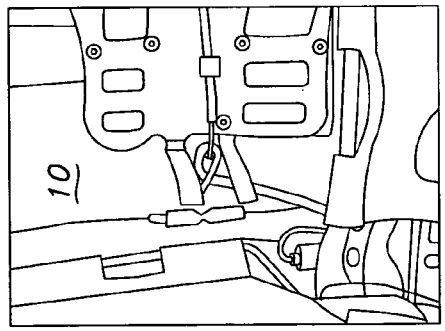
Figure 8E:
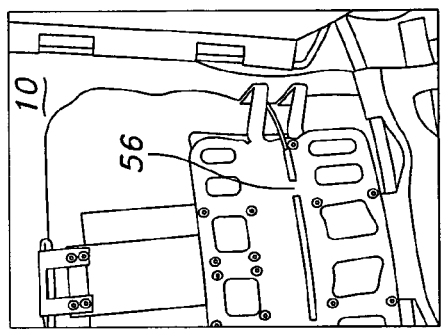
Figure 8A:
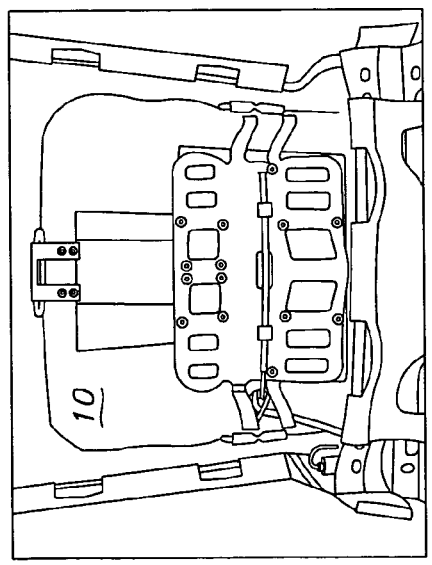
Figure 8D:
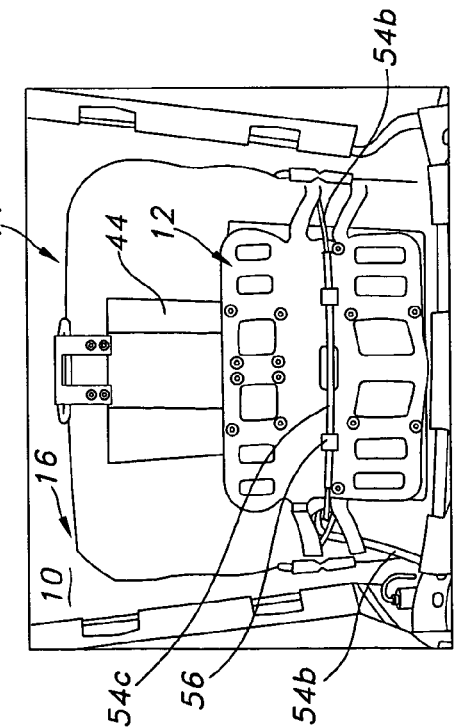

The following description of the preferred embodiments is merely exemplary in nature and is in no way intended to limit the invention, its application, or uses. As illustrated in FIGS. 1-3, the invention is generally directed to a trim foam lumbar seat support 10 which includes a lumbar 12 that is supported by and actuated between trim wires 14 that are embedded within the seat's foam cushioning or foam pad 16. The actuator 18 is connected to or otherwise attached to the lumbar 12 to adjust the lumbar 12 relative to the foam pad 16. The lumbar 12 has a face surface 12a that is apposed to and in contact with the B-surface 16a of the foam pad 16.

The foam pad 16 preferably includes further passages 20 through which fastening element extend and attach the lumbar 12 to the trim wires 14 within the passages 20. In the preferred embodiment, the fastening elements are hinged extension fasteners 22 which reach out from the sides 12b, 12c of the lumbar 12. It will be appreciated that other types of fasteners 22 could be used to connect the lumbar 12 to the trim wires 14. Preferably, each hinged extension 22 includes a hook or other snap-fit connection 22a at the end which extends through the foam pad passages 20 and attaches the lumbar 12 directly to the trim wires 14. One example of the hinge portion of the hinged extensions is generally referred to and known as a living hinge 22b. A protective band 24 is preferably attached to the B-surface 16a of the foam pad 16 and is apposed to and in contact with the face 12a of the lumbar 12. The protective band 24 is designed to increase the durability of the foam pad 16 in the region contacting the lumbar 12 and to improve the reaction of the trim foam lumbar support 10 to jounce. In the preferred embodiment, the protective band 24 is a fiber material which is 50 mm wide and molded directly to the B-surface 16a.

The trim foam lumbar support 10 can be connected to the seat frame 26 using a variety of connecting or fastening elements. However, it is preferred that the foam pad 16 include a bolster 16b that wraps around the side members 26a, 26b of the seat frame 26. In this manner, the entire support 10 is connected to the seat frame 26 through the foam pad 16. Additionally, the foam pad 16 has a pair of trenches 28 extending between the flat seat-back portion 16c of the foam pad and the bolster portion 16b of the foam pad. The trim wire 14 is preferably formed in the configuration of a wire loop 30 which has a pair of side wire sections 32a, 32b that respectively fit within the pair of trenches 28 along with a top section 34 and a bottom section 36.

In the preferred embodiment, the lumbar 12 is a belt support 38 with a panel 40 and a recessed center channel 42 extending between the top 38a and bottom 38b of the belt support 38. The hinged extensions 22 are integrally formed with or attached to the panel 40. It will be appreciated that more than one hinged extension 22 can be located at each one of the respective sides 12b, 12c of the lumbar 12. The lumbar 12 may also include an upper back support 44 which can extend from the middle of the panel and attaching to the top section 34 of the trim wire 14.

Figure 9:
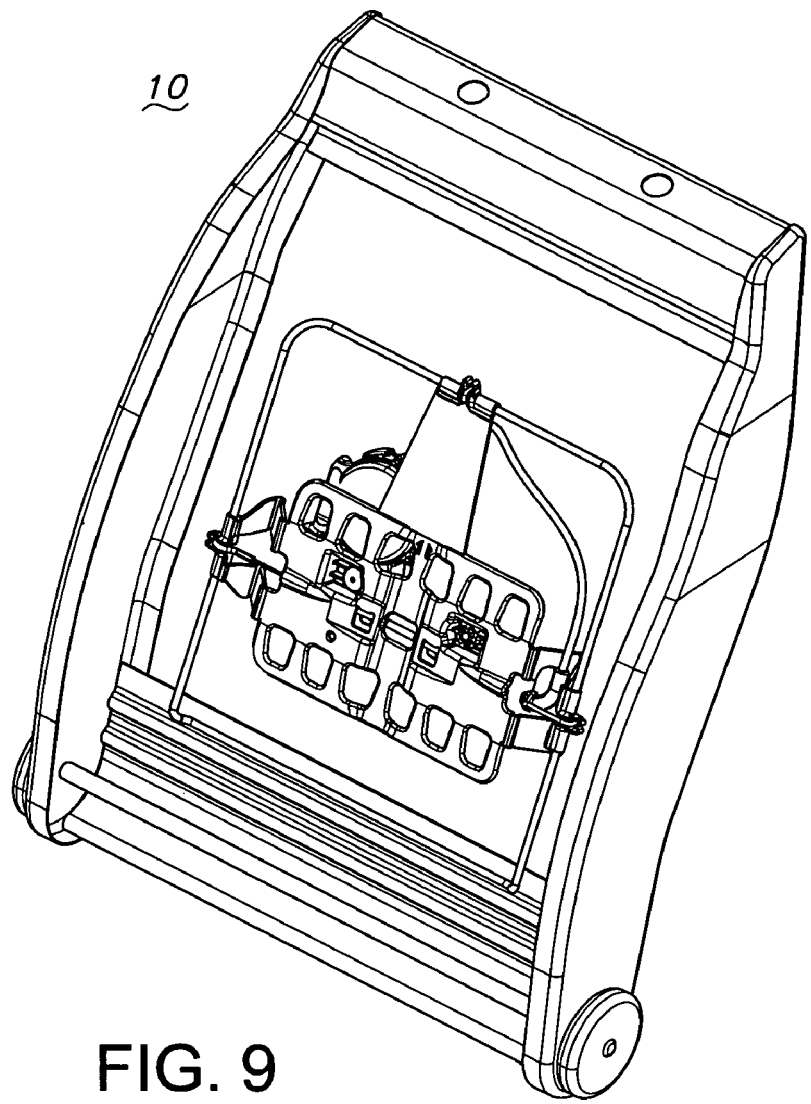
FIG. 9 is a view of the various attachments for the trim foam lumbar.
Figures 9A, 9B, 9C:
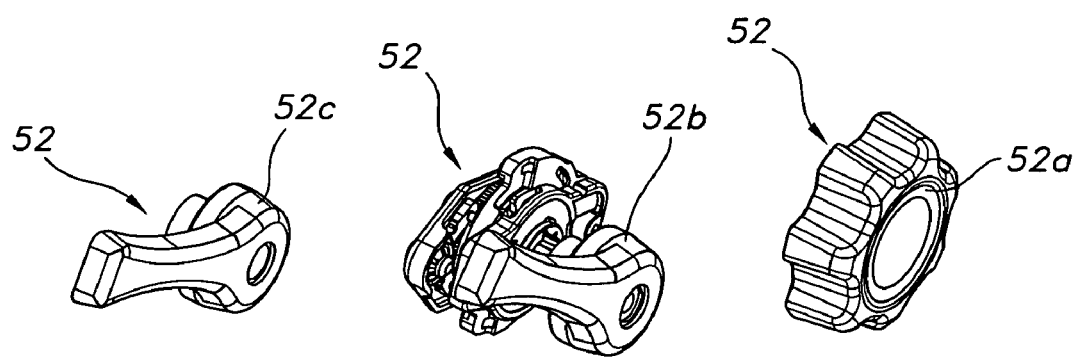

In the embodiments disclosed in FIGS. 1-3, the lumbar 12 has only a single panel 40. However, as illustrated in FIGS. 4-7, the panel 40 portion of the lumbar 12 may include a top panel 40a, a bottom panel 40b and a living hinge 46 therebetween. In FIGS. 4-7, the top panel 40a and bottom panel 40b can be adjusted independently from each other to provide varying amounts of support in the upper lumbar and lower lumbar regions, respectively. Additionally, in FIGS. 4-7, the actuator 18 is shown to be a powered drive 50 although manual drives 52 can also be used to adjust the lumbar 12. FIG. 8 illustrates different types of manual drives 52 that can be used with the present invention, including a manual rotary actuator 52a, a manual ratchet actuator 52b and a manual lever actuator 52c. Preferably, regardless of the particular type, the actuator 18 includes a bowden cable 54 having an outer sheath 54a and an inner wire 54b. The bowden cable extends between the sides 12b, 12c of the lumbar 12 and preferably includes a sheath segment 54c where the bowden cable contacts the lumbar back surface 12d. The outer sheath 54a and inner wire are connected to the trim wire 14 side wire sections 32a, 32b that respectively proximate to the sides 12b, 12c of the lumbar. As shown in FIG. 9, the lumbar back surface 12d may have snap fit clips 56 to hold the sheath segment 54c against the lumbar back surface 12d. Accordingly, when the tension in the inner wire 54b increases, it slides within the sheath 54a and shortens the effective length of the bowden cable 54 in the region between the trim wire 14 side wire sections 32a, 32b, thereby forcing the face 12a of the lumbar 12 further into the B-surface 16a of the foam pad 16.

According to the present invention with reference to the description of the particular embodiments above, it will be appreciated that there are many benefits and advantages to the trim foam lumbar seat support 10. The trim foam lumbar is frame independent. Frame side members can be tubes, stampings, wires, and can have varying widths and tapers without affecting the integration of the lumbar 12 into the existing seat designs because the lumbar is supported by and integrated with the existing design of the trim wire 14 and foam pad 16. Therefore, packaging issues with power recliners, air bags, armrests are minimized. Additionally, there is no need to make different designs for the driver and passenger sides of the vehicle.

Another benefit is that the trim foam lumbar support 10 uses fewer components than traditional lumbar supports. A common design of the adjustable trim foam lumbar support 10 can be installed to most seats, including existing seat designs. There is no custom fit required and the trim foam lumbar support 10 can accommodate a range of trench sizes, which typically have a length of 250 mm to 350 mm. No spring between the lumbar support and the seat frame 26 is required for overload conditions because the trim foam lumbar support 10 is connected to and supported by the foam pad 16 through its attachment to the trim wire 14 which results in the load being taken entirely by and being more evenly distributed through the seat back. No extra wires are required to attach the trim foam lumbar support 10 to the frame's side members 26a. No extra sinuous wire is required for the upper back area due the extended middle support or the upper back support 44 in the trim foam lumbar support 10. Also, all types of current actuators can be used to adjust the trim foam lumbar support 10, and less power is required to adjust the trim foam lumbar support 10 compared with traditional lumbar supports because there is no need to push out the trim trench tie downs and bolsters. Instead, since the lumbar is supported by the trim wires 14, the support is focused to the section of the foam pad 16 between the trim wires 14.

Yet another benefit of the trim foam lumbar support 10 is its packaging and installation. The trim foam lumbar support 10 has a thin package profile which is tightly apposed to the foam pad's "B" surface 16a. The trim foam lumbar support 10 can even be attached to the foam pad 16 before being installed in the seat frame 26. Accordingly, the present invention could eliminate traditional lumbar installation, inventory space, and shipping packaging. The trim foam lumbar support 10 also minimizes BSR because it does not have any metal to metal condition. Also, there is issue for thin foam around the vertical trench areas due to packaging between them. It will also be appreciated that different types of lumbar supports 12 can be used in the trim foam lumbar support system 10. For example, known lumbar supports include horizontal belt supports, flexible mats (or flexmat designs), bladders, paddles and other types of lumbar baskets.

Finally, the design of the trim foam lumbar support system 10 allows for the attachment of variety of other seat devices, such as massagers and heat-ventilation units, as well as the potential for a connection to between the upper back support 44 and an active head rest system (not shown). Accordingly, it will be appreciated that the present invention is applicable to all types of padded seats, including ground vehicle seats, aircraft seats, office chairs, recliners, couches, padded chairs and therapeutic seating systems.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A support for a seat, comprising:
a foam pad;
a trim wire at least partially embedded within said foam pad;
a lumbar comprising at least one panel, wherein said panel is in contact with said foam pad and wherein said lumbar is directly attached to said trim wire; and an actuator in operative relationship with said lumbar, wherein said actuator adjusts said panel relative to said foam pad; and
wherein said foam pad is selected from the group consisting of (a) a foam pad comprising a plurality of passages and wherein said lumbar comprises a plurality of hinged extensions connected to said panel and said hinged extensions extending through respective ones of said passages and connecting said lumbar directly to said trim wire, (b) a foam pad comprising a protective band apposed to and in contact with said lumbar, and (c) a foam pad comprising a pair of trenches and wherein said trim wire comprises a pair of side wire sections respectively fitting within said pair of trenches.

2. The support according to claim 1, wherein said foam pad further comprises a plurality of passages and wherein said lumbar comprises a plurality of hinged extensions connected to said panel, said hinged extensions extending through respective ones of said passages and connecting said lumbar directly to said trim wire.

3. The support according to claim 1, wherein said foam pad further comprises a protective band apposed to and in contact with said lumbar.

4. The support according to claim 1, wherein said foam pad further comprises a pair of trenches and wherein said trim wire comprises a pair of side wire sections respectively fitting within said pair of trenches.

5. The support according to claim 1, wherein said trim wire is a loop comprising a pair of side wire sections, a top section and a bottom section.

6. The support according to claim 1, wherein said lumbar comprises a belt support.

7. The support according to claim 6, wherein said belt support comprises a pair of hinged extensions respectively extending between said panel and said trim wire.

8. The support according to claim 6, wherein said belt support further comprises a recessed center channel extending between a top and a bottom of said belt support.

9. The support according to claim 1, wherein said lumbar further comprises an upper back support attached to a top section of said trim wire.

10. The support according to claim 1, wherein said lumbar further comprises a top panel, a bottom panel, and a living hinge therebetween.

11. The support according to claim 1, wherein said actuator is comprised of a powered drive.

12. The support according to claim 1, wherein said actuator is selected from the group of manual drives consisting of a manual rotary actuator, a manual ratchet actuator and a manual lever actuator.

13. The support according to claim 1, wherein said trim wire is further comprised of a pair of side wire sections and wherein said actuator is further comprised of a bowden cable having a sheath segment in contact with said lumbar, an outer sheath connected to one of said side wire sections, and an inner wire connected to another of said side wire sections.

14. The support according to claim 13, wherein said bowden cable extends from a first side of said lumbar to a second side of said lumbar and is further comprised of a sheath segment in contact with said lumbar, wherein said outer sheath is connected to said trim wire proximate to said first side of said lumbar and wherein said inner wire is connected to said trim wire proximate to said second side of said lumbar.

15. The support according to claim 1, wherein said actuator forces said lumbar toward said pad.

16. The support according to claim 1, further comprising a seat frame, said seat frame comprising side members, wherein said foam pad comprises a bolster wrapping around said side members of said frame.

17. A support for a seat, comprising:
a foam pad comprising at least a pair of trenches and a plurality of passages within said pair of trenches;
a trim wire at least partially embedded within said foam pad, said trim wire comprising a pair of side wire sections embedded within said corresponding pair of trenches;
a lumbar extending between and directly attached to said pair of side wire sections, said lumbar comprising at least one belt support panel apposed to and in contact with said foam pad, said lumbar further comprising a plurality of fasteners connected to said belt support panel, said plurality of fasteners extending through said passages and attaching said belt support panel directly to said pair of side wire sections; and
an actuator in operative relationship with said lumbar, wherein said actuator adjusts said belt support panel relative to said foam pad.

18. The support according to claim 17, wherein said foam pad further comprises a seat-back portion and a bolster portion, said pair of trenches and said plurality of passages being situated between said seat-back portion and said bolster portion, and wherein said plurality of fasteners comprise a plurality of hinged extensions with hooked ends, said hinged extensions extending through respective ones of said passages and said hooked ends connecting said lumbar to said trim wire.

19. The support according to claim 17, wherein said foam pad further comprises a protective band apposed to and in contact with said lumbar.

20. The support according to claim 17, further comprising a seat frame, said seat frame comprising side members, wherein said foam pad comprises a bolster wrapping around said side members of said frame.

21. A support for a seat, comprising:
  a foam pad comprising a plurality of passages, a protective band and a pair of trenches;
  a trim wire at least partially embedded within said foam pad and said trenches, said trim wire comprising a pair of side wire sections;
  a lumbar extending between said pair of side wire sections and supported by said trim wire through a plurality of fasteners, wherein a front surface of said lumbar is apposed to and in contact with said protective band and wherein said lumbar comprises at least one panel, wherein said plurality of fasteners are hinged extensions connected to said panel and directly attaching said panel to said side wire sections, and wherein said hinged extensions extend through said plurality of passages to connect said lumbar to said side wire sections; and
  an actuator in operative relationship with said lumbar, wherein said actuator adjusts said lumbar relative to said foam pad and comprises a bowden cable with an outer sheath connected to one of said side wire sections, an inner wire connected to another of said side wire sections, and a sheath segment in contact with said lumbar.

22. The support according to claim 21, wherein said lumbar comprises a belt support comprising a recessed center channel extending between a top and a bottom of said belt support.

* * * * *